US 7,454,386 B2

(12) United States Patent
Chakraborty

(10) Patent No.: US 7,454,386 B2
(45) Date of Patent: Nov. 18, 2008

(54) LEARNING MANAGEMENT SERVER USING BAYESIAN METHODS FOR ADAPTIVE HYPERMEDIA

(75) Inventor: Amit Chakraborty, Cranbury, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 337 days.

(21) Appl. No.: 11/107,708

(22) Filed: Apr. 15, 2005

(65) Prior Publication Data

US 2006/0235813 A1 Oct. 19, 2006

(51) Int. Cl.
*G06F 15/18* (2006.01)
(52) U.S. Cl. ............................. 706/12; 706/45; 715/707
(58) Field of Classification Search .................. 700/45; 706/12, 45; 715/707
See application file for complete search history.

(56) References Cited

U.S. PATENT DOCUMENTS 5,774,123 A * 6/1998 Matson ...................... 715/854
6,993,586 B2 * 1/2006 Chen et al. .................. 709/228
2002/0143873 A1 * 10/2002 Lamp ......................... 709/204
2003/0039948 A1 * 2/2003 Donahue ..................... 434/322
2003/0154180 A1 * 8/2003 Case et al. ...................... 707/1
2005/0287509 A1 * 12/2005 Mohler ........................ 434/350

OTHER PUBLICATIONS

"Adaptation in E-Learning Environments through the Service-Based Framework and its Application for AdeLE", Guetl, C., Garcia-Barrios, V. & Moedritscher, F., Proceedings of World Conference on E-Learning in Corporate, Government, Healthcare, and Higher Education 2004.*

* cited by examiner

*Primary Examiner*—David R Vincent
*Assistant Examiner*—Mai T Tran

(57) ABSTRACT

A learning management system includes a content storage unit for storing learning content, a user modeling unit in signal communication with the content storage unit and having a user model, a personalization unit in signal communication with the content storage unit for personalizing the learning content stored in the content storage unit in response to the user model, and a user interface in signal communication with the content storage unit for enabling a user to interact with the learning management system, wherein the learning management system delivers content responsive to user interaction with the learning management system.

18 Claims, 6 Drawing Sheets

LEARNING MANAGEMENT SERVER USING BAYESIAN METHODS FOR ADAPTIVE HYPERMEDIA

BACKGROUND OF THE INVENTION

1. Technical Field

The present disclosure relates to hypermedia content delivery systems, and more particularly, to adaptive education delivery systems.

2. Discussion of the Related Art

The Internet is playing an increasingly significant role in the everyday lives of people. In this extensive information and knowledge diffusion context, users may differ in their training, motivation, technical abilities and tasks desired to be completed. The dissemination of a huge amount of information for a different category of people and of different levels of sophistication results in a lack of relevance of certain information for certain users. This is especially true in the case of a learning environment, where, to make the experience favorable to the user, it is imperative that adaptive hypermedia ("AH") techniques be used to shield the user from extraneous information that might otherwise clutter his attention. The attraction of hypermedia for education lies in its ability to actively engage the learner in the acquisition and use of information, to support multiple different instructional uses (tutoring, exploration, research etc.), to support different learning styles, and to promote the acquisition of different representations that underlie expert-level reasoning in complex, ill-structured domains.

Unfortunately, several problems are encountered in practice. It is unlikely that all the learners will be similarly suited to the same pacing and sequencing. The learner knowledge can be widely different to start with and is likely to grow differently during interaction with the system. For the uninitiated learners, they can get lost especially if the domain is new and the corpus is large. Learners may fail to get an overview of how all the relevant information is related while browsing. In the absence of information that might help them formulate the goals and find relevant material, they may stumble through the corpus in a disoriented and disorganized manner, which is inefficient. In addition, the learner is not always going to choose an effective path through the information tree.

The introduction of adaptivity into educational hypermedia is aimed at providing the system with the ability to change dynamically according to the changing learners needs. In general, there are two conventional ways to introduce adaptivity in hypermedia systems, namely adaptive presentation and adaptive navigation.

Adaptive presentation allows the adaptation of the contents or the presentation of information included in a page. This itself can be of two main types. Adaptive multimedia presentation is designed to present the multimedia or the non-textual elements in the page differently. Adaptive text presentation methods offer the user additional information regarding the contents in the page.

Adaptive presentation examples include additional explanation techniques that allow pieces of information on a particular concept to be hidden or presented based on the user requirements. Beginners, for example, may need more explanation but fewer low-level details. Pre-requisite and comparative explanation techniques can modify the presentation of information regarding the concept, presenting what is relevant based on the user's level of knowledge. Explanation variant techniques can present the same information to different users in different forms, based on their preferences.

Adaptive navigation such as link-level adaptation support includes different techniques used in the AH systems to help the users navigate the content. Examples include direct guidance techniques where the system decides which is the next best node to visit. In adaptive ordering, the system orders the links based on a user model. With link hiding techniques links are hidden, removed, or disabled. In Adaptive annotation techniques comments on the link, which can be presented as text or as visual cues, inform the user regarding the contents of the linked nodes. Coloring schemes, for instance, can be used to show a particular preference. Map annotation techniques include different ways of adapting the pattern of hypermedia maps presented to a user.

The Sharable Content Object Reference Model ("SCORM") specification defines a web-based learning Content Aggregation Model and Run-time environment for learning objects, and is well known in the art. It is basically a reference model that references a set of interrelated technical specifications and guidelines designed to meet the United States Department of Defense's ("DoD") high-level requirements for web based learning content. These requirements include, but are not limited to, reusability, accessibility, durability and interoperability.

SCORM consists of three main sections: an Extensible Markup Language ("XML")-based specification for representing course structures so courses can be moved from one server or Learning Management Server ("LMS") to another; a set of specifications relating to the run-time environment, including an API, content-to-LMS data model, and a content launch specification; and a specification for creating metadata records for courses, content and raw media elements. These specifications enable the reuse of Web-based learning content across multiple environments and products. SCORM standards enable small, reusable, sharable course content; discoverable learning content such as interoperable repositories; the ability to find and move entire courses; vendor support for SCORM-compliant off-the-shelf products; and the development of adaptive learning systems that can assemble content to meet the learners needs on-the-fly.

SUMMARY OF THE INVENTION

These and other drawbacks and disadvantages of the prior art are addressed by an exemplary learning management system and corresponding method.

An exemplary learning management system includes a content storage unit for storing learning content, a user modeling unit in signal communication with the content storage unit and having a user model, a personalization unit in signal communication with the content storage unit for personalizing the learning content stored in the content storage unit in response to the user model, and a user interface in signal communication with the content storage unit for enabling a user to interact with the learning management system, wherein the learning management system delivers content responsive to user interaction with the learning management system.

An exemplary corresponding method for modeling a user to deliver the appropriate content includes modeling the user at a macro level by selecting a user type and modeling the user at a micro level in response to the macro modeling by gauging the user sophistication and interest level.

These and other aspects, features and advantages of the present disclosure will become apparent from the following description of exemplary embodiments, which is to be read in connection with the accompanying drawings.

DETAILED DESCRIPTION OF PREFERRED EMBODIMENTS

Exemplary embodiment methods, systems, and apparatus are provided for adaptively delivering content based on users needs.

Figure 1:
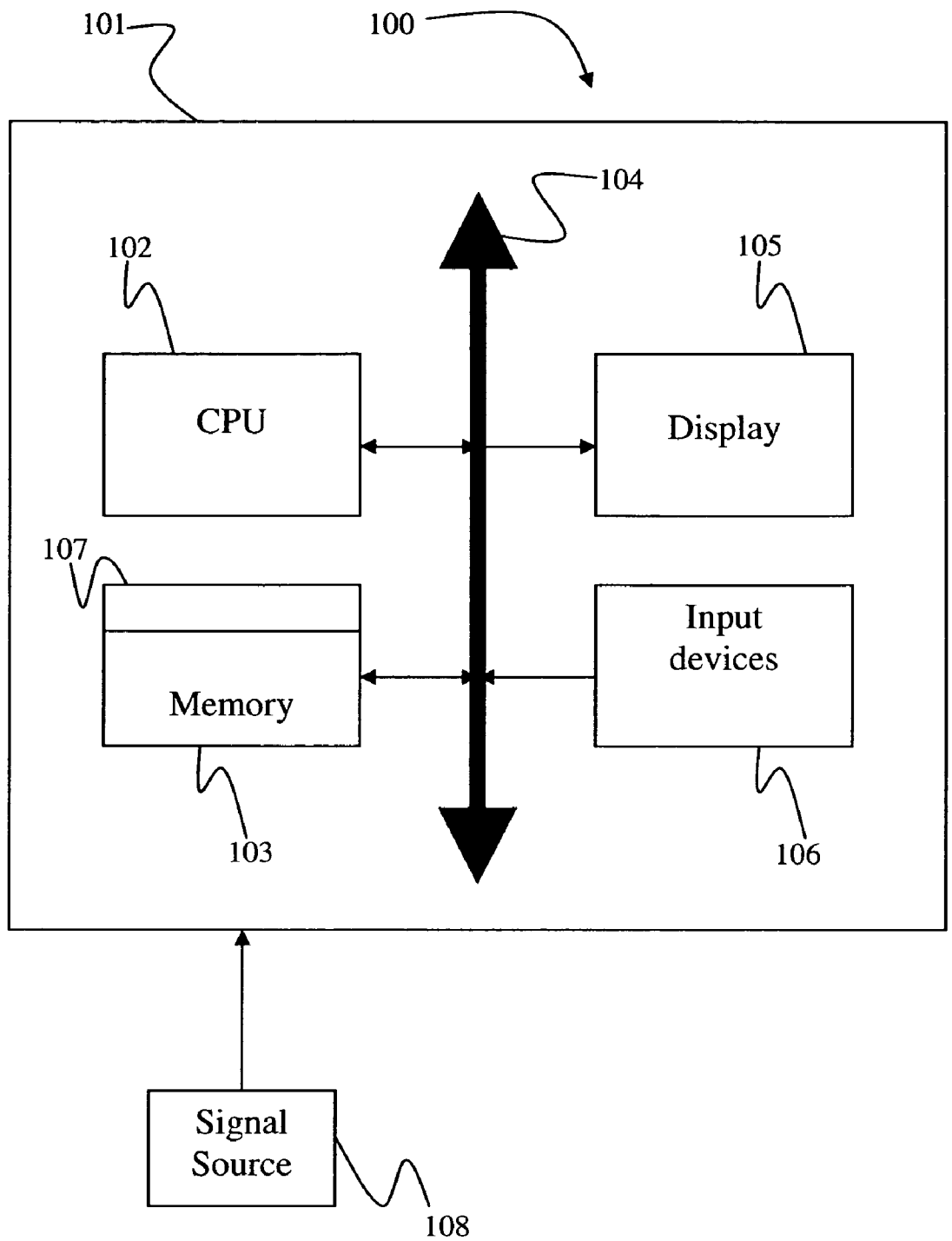
FIG. 1 is a schematic diagram showing a computer system in accordance with an exemplary embodiment of the present disclosure.

As shown in FIG. 1, a system according to an exemplary embodiment of the present disclosure is indicated generally by the reference numeral 100. The system 100 includes a computer system 101 having a central processing unit ("CPU") 102, a memory 103 and an input/output ("I/O") interface 104. The computer system 101 is generally coupled through the I/O interface 104 to a display 105 and various input devices 106 such as a mouse, keyboard, and imaging devices, for example. The support circuits can include circuits such as cache memory, power supplies, clock circuits, and a communications bus. The memory 103 can include random access memory ("RAM"), read only memory ("ROM"), disk drive, tape drive, and the like, or a combination thereof. Embodiments of the present disclosure can be implemented as a program routine 107 that is stored in a memory 103 and executed by the CPU 102 to process a signal from a signal source 108. As such, the computer system 101 may be a general-purpose computer system that becomes a specific purpose computer system when executing the program routine 107.

The computer system 101 may also include an operating system and microinstruction code. The various processes and functions described herein may be part of the microinstruction code or part of the application program, or a combination thereof, which is executed via the operating system. In addition, various other peripheral devices may be connected to the computer platform, such as an additional data storage device and a printing device.

Learning Management System ("LMS") is a term that refers to a suite of functionalities designed to deliver, track, report on and administer learning material, student progress and student interaction. LMS can refer to a very simple course management system or it might refer to highly complex enterprise-wide distributed learning environments.

Figure 2:
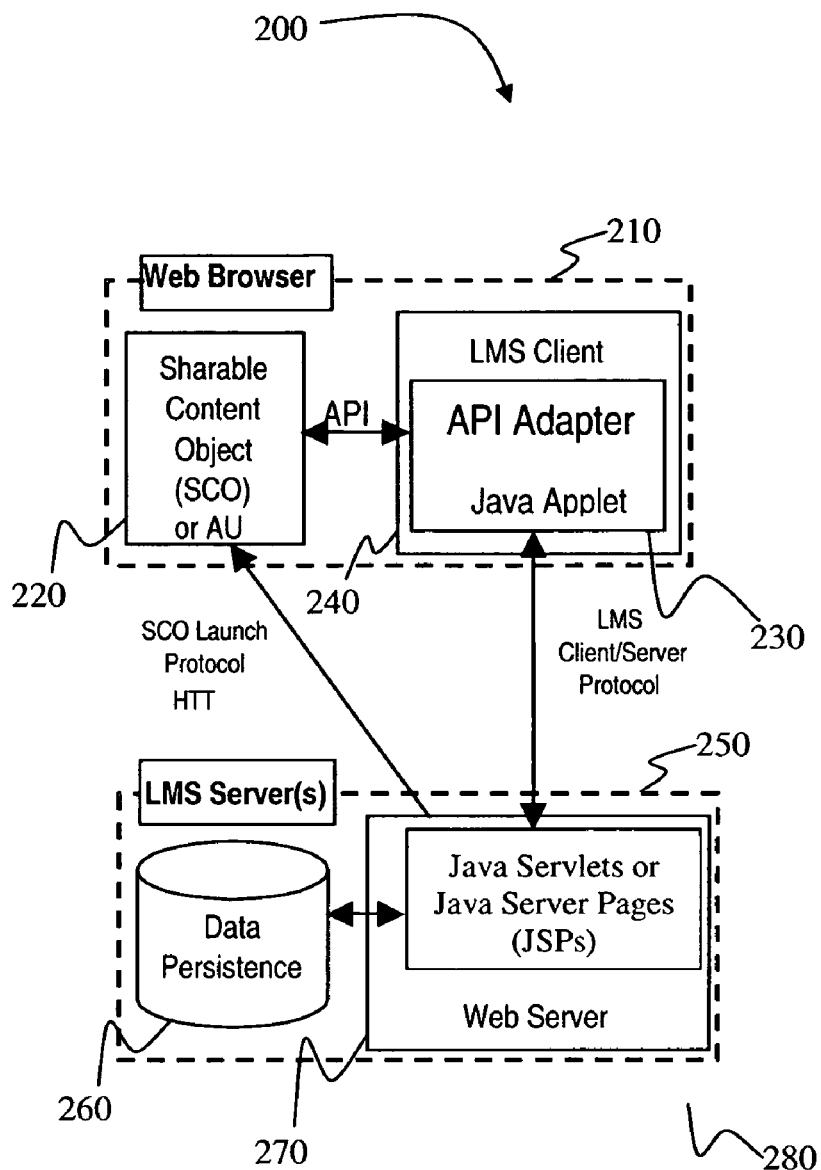
FIG. 2 is a schematic diagram showing a Sharable Content Object Reference Model ("SCORM") based Learning Management Server ("LMS") architecture in accordance with an exemplary embodiment of the present disclosure.

Turning to FIG. 2, an exemplary embodiment generalized Sharable Content Object Reference Model ("SCORM") based LMS architecture is shown in FIG. 2, and is indicated generally by the reference numeral 200. A web browser 210 comprises a user interaction part 220 that both displays learning content, and receives input from the user. The course work that comprises the learning content can be broken into modules, within the SCORM framework, called Assignment Units ("AU")s. AUs are course segments that have some level of completeness to themselves so they can be combined in different ways to create different courses. They are the building blocks of new content. The web browser 210 also includes a LMS Client 230 that is in two-way communication with the user interaction part 220, such as a web browser window, controlling what is presented to the user and receiving their input.

One or more LMS Servers 250, depicted here as a single LMS server for ease of illustration, includes a data storage device 260 that stores the content that is to be presented. The LMS Server 250 also includes a web server 270 that sends content to the user interaction part 220. The web server 270 contains an application 280 that interacts with both the LMS Client 230 and the data store 260 to decide what content, which can be in the form of AUs, is sent to the user interaction part 220.

Even within the SCORM context, LMS realizations are expected to vary widely. A server-based environment is normally implied, where the server contains the intelligence for the delivery of learning content. In other words, SCORM content does not determine how the user navigates through a course, exactly what content is displayed, or when a subject is completed. That functionality rests entirely within the LMS. What SCORM deals with is how the learning units are organized and how they can be reused to create different lessons suitable for different users. One of the major requirements of SCORM is that the course material be transferable from one LMS to the other.

In an exemplary embodiment, a Learning Management System can monitor student progress and interaction and deliver learning content accordingly. A simple client-server model is used that makes use of server-side technologies such as JSPs and Servlets. At every point, an XML file or a JSP page is served up to the user, where the file or page, in turn, is composed of much smaller Assignment Units ("AU"s). While the AUs themselves are constant, the XML page that is served up varies because the composition of assignment units that make up the XML page varies based on the user sophistication level and interest, for example.

Figure 3:
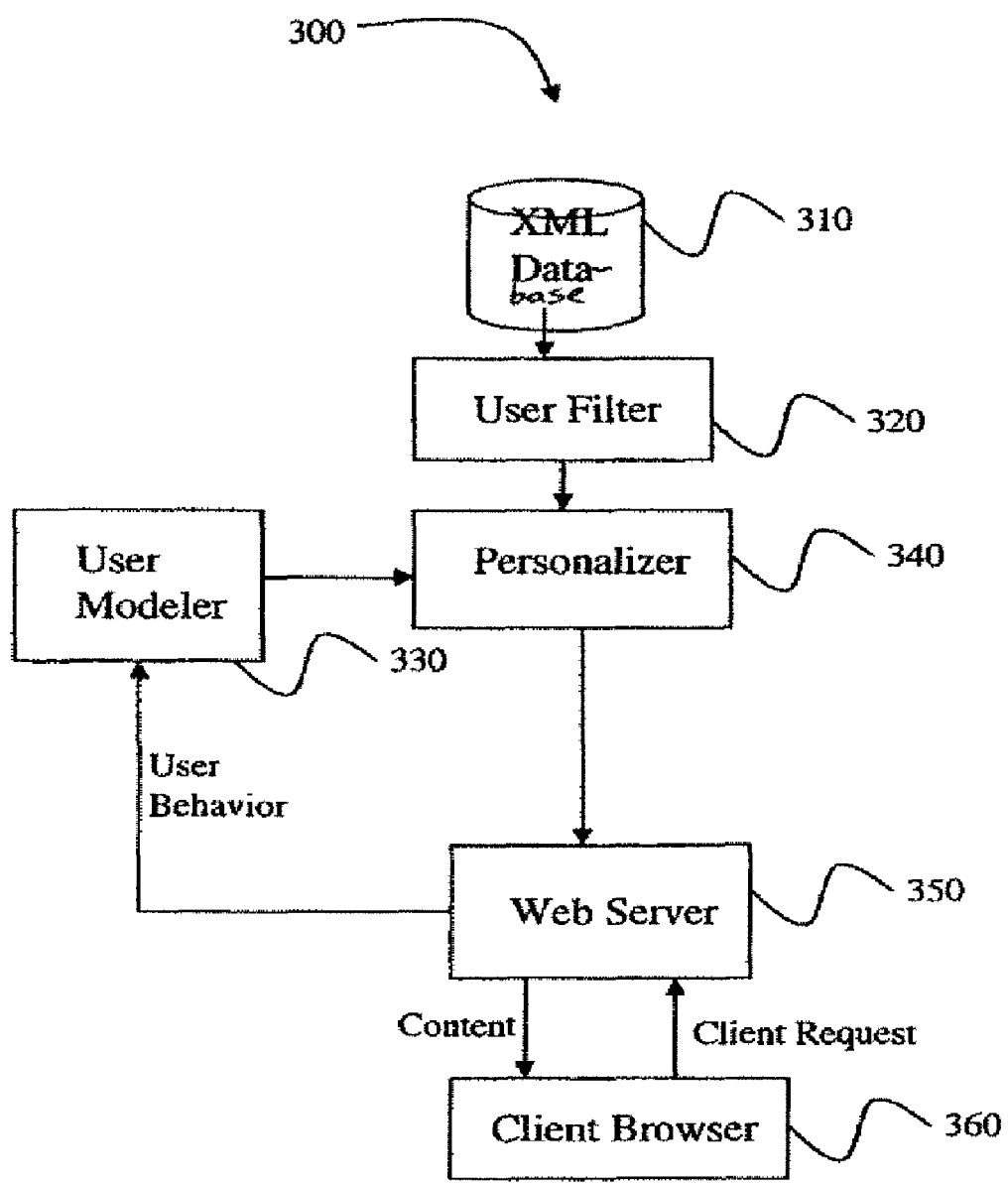
FIG. 3 is a schematic diagram illustrating a LMS system architecture in accordance with an exemplary embodiment of the present disclosure.

Turning now to FIG. 3, an exemplary embodiment LMS client-server model is indicated generally by reference numeral 300. The LMS 300 comprises a database 310, User Filter 320, User Modeler 330, Personalization Unit 340, web server 350 and client browser 360.

The database 310 is an example of a Content Storage Unit ("CSU"). The CSU stores various text and non-text data fragments that can constitute the AUs, and can be organized as XML fragments. The data fragments can comprise any media element including a simple text paragraphs or a complex video scene.

A User Modeling Unit ("UMU") used to model a user comprises two parts depicted in FIG. 3, the User Filter 320 and the User Modeler 330. The User Filter 320 is used to distinguish between different user types and is determined initially at the login stage itself. Examples of such types might include teacher and student, in the case of a classroom course setting. In a hospital setting, they can include a nurse, doctor and patient. The User Filter 320 is used to model the user at a more macro level. The User Modeler 330 continuously keeps track of different user characteristics. These characteristics can include user sophistication level, user interaction with the system, user interest level and others. The user modeler 330 is used to model a user at a more micro level. Based on this information the Personalization Unit 340 creates and serves up the correct content in the form of the appropriate AUs.

The Personalization Unit 340 selects the appropriate stored atomic units and builds the correct AU to present to the user. This selection and construction are based on the prior experience with the user, as stored and updated in the UMU, and the user's current interactions with the system.

The web server 350 sends the content from the Personalization Unit 340 to the Client Browser 360 where a user interacts with the content. Data about the user's behavior is sent back to the web server 350 by the client browser 360, which sends the information to the user modeler 330.

An exemplary embodiment User Modeling Unit or UMU, which comprises the User Filter 320 and the User Modeler 330, is described as follows. In modeling a user, a two level classification procedure is used. The first level is more of a macro modeling of a user and the second level is more of a micro modeling of a user.

The macro modeling of the user is the easier of the two and simply involves selecting the type of the user from a few set profiles. For instance, in the case of a course, the content that is delivered to the teacher and the student will be completely different, and so will be the navigation. Teachers for example are allowed to see the top level and they are not given many suggestions by the system, as they know what they are looking for. While teachers can look at both the questions and the answers, students cannot. In the case of a hospital LMS, doctors may be allowed to see some things that a patient might not, and so on. The second level of modeling is significantly dependent on this level.

In an exemplary embodiment, a registration form that asks the user certain basic questions can be used to determine the type group to which the user belongs. However, once this information is entered in a user database, it would not have to entered again before a subsequent session.

The micro modeling of a user, in continuing the exemplary embodiment of a UMU of the current invention, is the more difficult of the two and is where the real adaptivity comes into play. Here user interaction is tracked. Based on the nodes visited, the UMU can infer the user sophistication level and interest level of the user to create the next page that will be visited by the user. Some of the features that can be observed are the amount of time spent on a page, the links visited from a particular page and the scrolling activity. These features or characteristics can be incorporated into the LMS system definition equations.

Whenever content is sent to the user, the level of difficulty is taken into account, which is, in turn, decided by the user interaction and the history of pages traveled before. Thus, given the current history for this session, the profile that suits the user best needs to be chosen.

To make the problem tractable, a finite number of profiles that describes the user sophistication level are assumed. The set of profiles is given by $\{P_1, P_2, \ldots, P_n\}$, where n is the number of profiles. At any time t, the page visitation history is given by $H=\{h_t, h_{t-1}, h_{t-2}, \ldots, h_0\}$. Thus, the problem can be restated as $\max_{i \in n} p(U=P_i/H)$, where U is the Profile that is assigned to the user.

To avoid infinite memory requirements, the page history can be defined by a finite order Markov chain: $p(h_t|h_{t-1}, h_{t-2}, \ldots, h_0) = p(h_t|h_{t-1}, h_{t-2}, \ldots, h_{t-k})$ Under the above assumption, it can be shown that:

$$\max_{i \in n} p(U=P_i|H) \propto \max_{i \in n} p(U=P_i|H_k) \quad (1)$$

where $H_k = \{h_t, h_{t-1}, h_{t-2}, \ldots, h_{t-k}\}$ and U represents the user.

Further, a bit of algebra and the above equation can be reduced to:

$$\max_{i \in n} p(U=P_i|H) \propto \max_{i \in n} p(H_k | U=P_i) p(U=P_i) \quad (2)$$

The first term in the above equation, $p(H_k|U=P_i)$, is called the data term and the second term, $p(U=P_i)$, is called the prior term. The data term determines the likelihood that a particular page sequence is viewed given the profile and the prior term determines the likelihood of that profile itself.

To simplify things further, it can be temporally assumed as a first order Markov chain, which means that one can replace $H_k$ with $h_t$, the last page viewed.

To determine the first term, a probability distribution function needs to be created for the page being viewed. Assume that a page can be viewed, but the likelihood of it being viewed is determined by the user behavior, which translates to a score (s), and the expected user behavior for each profile ($s_i$). Assume that:

$$p(H_t|U=P_i) \propto \alpha_i p(s|U=P_i) \quad (3)$$

where $\alpha_i$ is a constant so that the above summed over all the profiles adds up to 1.0, and $$p(s|U=P_i) = \frac{1}{\sqrt{2\pi}\,\sigma} e^{-(s-s_i)^2/2\sigma_i^2} \quad (4)$$

For the prior term, assume that the probability of a profile is dependent on what the profile was before this step and prior experience. Assume a Markov Random process for this and a Gibbs Distribution and thus the profile is given by:

$$p(U=P_i) \propto e^{-\text{dist}(Pi,Pt-1)} \quad (5)$$

where $\text{dist}(P_i, P^{t-1})$ is the distance between the current profile under consideration and the previous profile, also known as the transition matrix.

Thus, every time the user takes a step, the profile to which the user is most likely to belong is recomputed, which is then, in turn, used to serve up the next page. Thus, if there are 3 possible paths, that path which is most suitable for this category of user is presented. Additionally the probability distribution function for a particular profile is also updated. In other words, the system learns and updates itself at every visit with the likelihood of visit for a particular profile.

The success of an Adaptive Hypermedia system depends significantly on the content creation process. The whole course may be formatted within the SCORM framework, using XML, where the course consists of a set of global properties, objectives and most importantly, blocks, which can be recursive and can be conceived of as a contiguous group of class materials. These XML files that make up the AUs are presented to the user in their learning browser as explained below.

Figure 4:
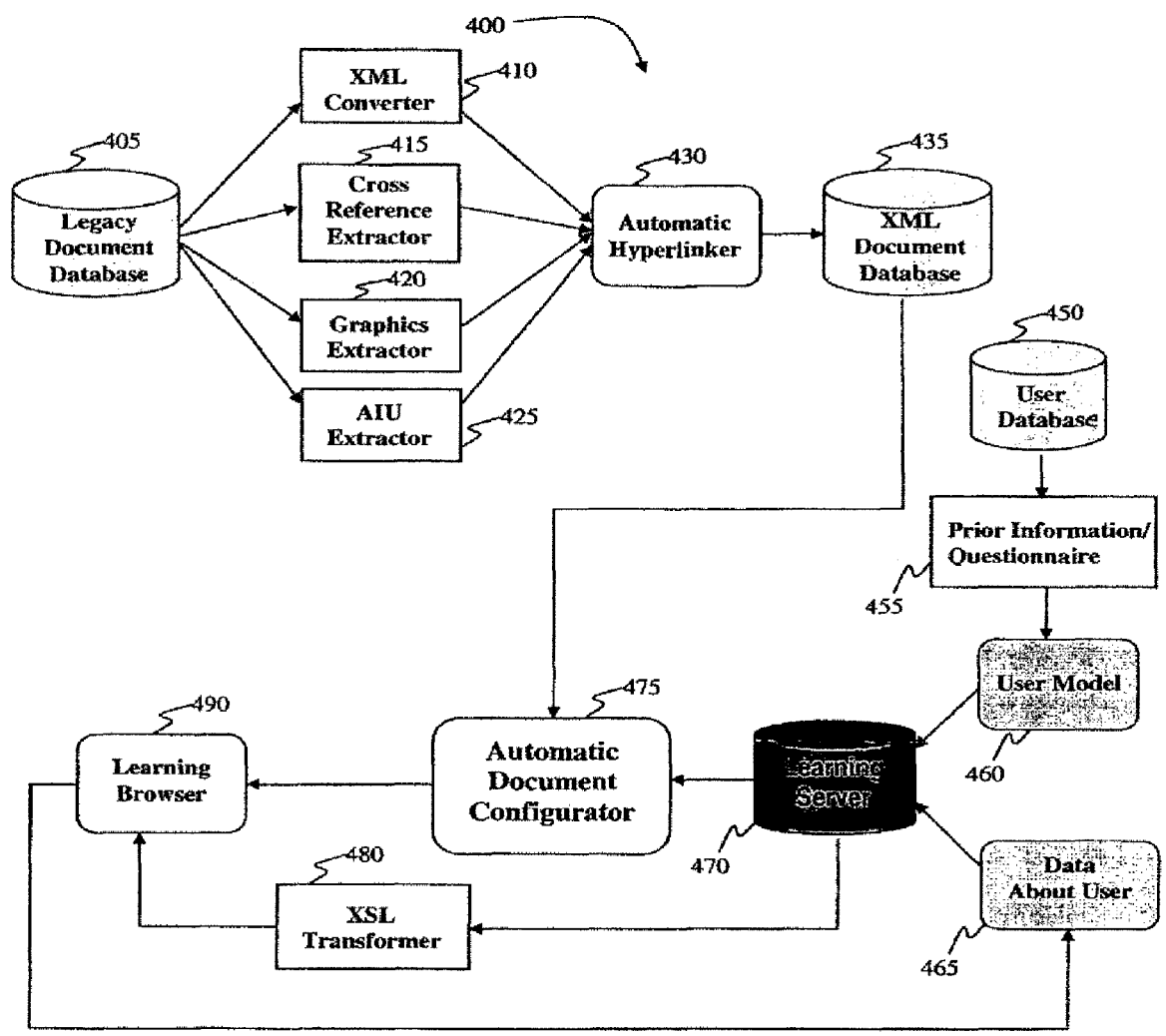
FIG. 4 is a schematic diagram illustrating a system for Adaptive Hypermedia Authoring in accordance with an exemplary embodiment of the present disclosure.

As shown in FIG. 4, an exemplary embodiment system for Adaptive Hypermedia Authoring is indicated generally by reference numeral 400. The Legacy Document Database 405 contains the legacy content that will be converted to work with exemplary embodiments. If the content is not in XML format, it is converted to such by the XML Converter 410. All cross references between the different textual elements are extracted by the Cross Reference Extractor 415. Additionally, all the non-text media such as graphics and video are extracted by the Graphics Extractor 420. For the non-text media, areas of interest, called Hotspots, are extracted by the Anchorable Information Unit ("AIU") Extractor 425.

All Hotspots extracted in this fashion are also known as Anchorable Information Units ("AIU"s). Information regarding these AIUs is stored in AIU files, which are associated files that follow the XML syntax and follow a Document Type Definition ("DTD"). Thus, every non-text media file is associated with an AIU file, wherever necessary, that contains information regarding the AIUs or points of interest and has descriptions about them. Hyperlinks between the different XML fragments for textual media and AIU files for non-textual media are created in an Automatic fashion using the Automatic Hyperlinker 430. The output of this is stored in the XML Document Database 435, fragments of which are then later extracted and used for creating the actual documents that are served up to the user on the fly.

The exact documents that are served to the user are provided via the Learning Browser 490, which is fed by the Learning Server 470. The inputs to the Server are the User Model 460 and the data about the user 465 that is collected by the Learning Browser 490. The whole course in itself is an XML document tree, with each node representing an XML file. One can conceptually view the whole course as a modified table of contents. This table of contents is generated in a dynamic fashion as the user goes through the content, based on the user requirements and the tutor, which in this case is the learning server. However, the learning server also determines the content that is presented to the user; thus, different users can see the same heading, but the content underneath is changed to suit the skills and interest of the user. To accomplish this, the Learning Server 470 provides information to the Automatic Document Configurator 475 that extracts appropriate XML fragments from the XML Document Database 435 and creates the documents in a dynamic fashion. Presentation of the content is also changeable by the XSL Transformer 480, allowing the same content to be presented in different styles, based on the user's needs. For example, the color of specific text can be changed to add emphasis, based on the user's preferences and profile, where needed.

Figure 5:
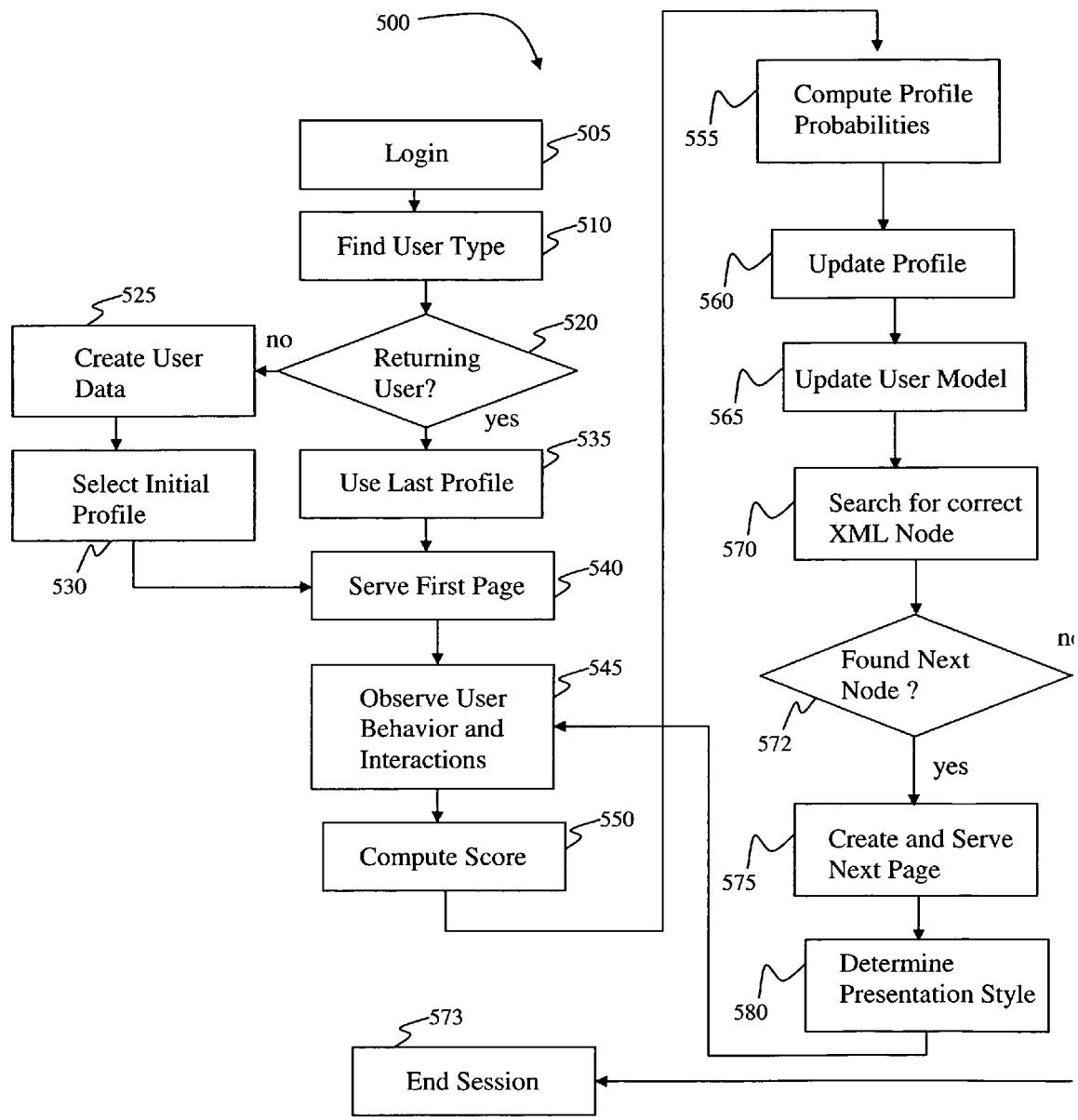
FIG. 5 is a flow diagram illustrating a Bayesian method for adaptive hypermedia in accordance with an exemplary embodiment of the present disclosure.

Turning to FIG. 5, an exemplary embodiment LMS method is indicated generally by reference numeral 500. The flow diagram 500 depicts an exemplary embodiment of the process an LMS can follow. The fist step is for the user to login, represented by block 505. Logging in not only verifies the credentials of the user, but also assists in accomplishing user specific tasks. Since a lot depends on appropriate personalization, login is a key step in the process. Block 510 depicts the step of finding out what the user type is, such as whether a teacher or student, for example, and categorizing the user in the best application mode.

A decision block 520 determines if this is a returning user. If this is a returning user, control flows to block 535, which selects the last profile used along with all the stored personalized values such as interests, skill level, and the like. Control then flows onto block 540 unless this is a new user. If this is a new user, control flows to block 525, where the user is registered with the system creating all necessary data. The next time the user uses the system they will be treated as a returning user. Block 530 then selects an initial profile for the user that is of moderate sophistication. Control then flows to Block 540.

Block 540 serves the first personalized page of content to the user, based on the personalization, current skill level as determined by a questionnaire, for example, and like considerations. Block 545 represents the step of then observing user behavior and interactions as the user progresses through the course content. The data collected includes time spent, links on pages visited and, in turn, the time spent on them, the scrolling behavior, and the like. This data is later used to determine the user sophistication level.

Before the user receives a new page of content, control goes to block 550, which computes a score based on the data collected in the previous block and contents of the page. This score is a composite function of all of the above collected data as well as the results submitted by the user to the server on a test or questionnaire, as appropriate, which, in turn, is determined by the server. Control then flows to block 555.

Block 555 represents the step of computing profile probabilities. For each one of the profiles under consideration, the probability of inclusion is computed, which is a function of the observed score and the profile properties. Control now flows to block 560

In block 560, the profile level or user sophistication level is based on the calculations of block 545 and the transition probability matrix. Control then flows to Block 565 Block 565 represents the step of updating the user model, which is determined by the probability of belonging to any of the profiles.

Control then goes to Block 570 where, based on the updated user model, the appropriate Assignment Unit, which is an XML node in the course tree, is determined. Block 575 then determines the specific content of the page to be served, based on the user model. Block 580 then receives control and the presentation style of the page is determined and sent to the user. Control then loops back to Block 545 and the process repeats until the end of the course.

Figure 6:
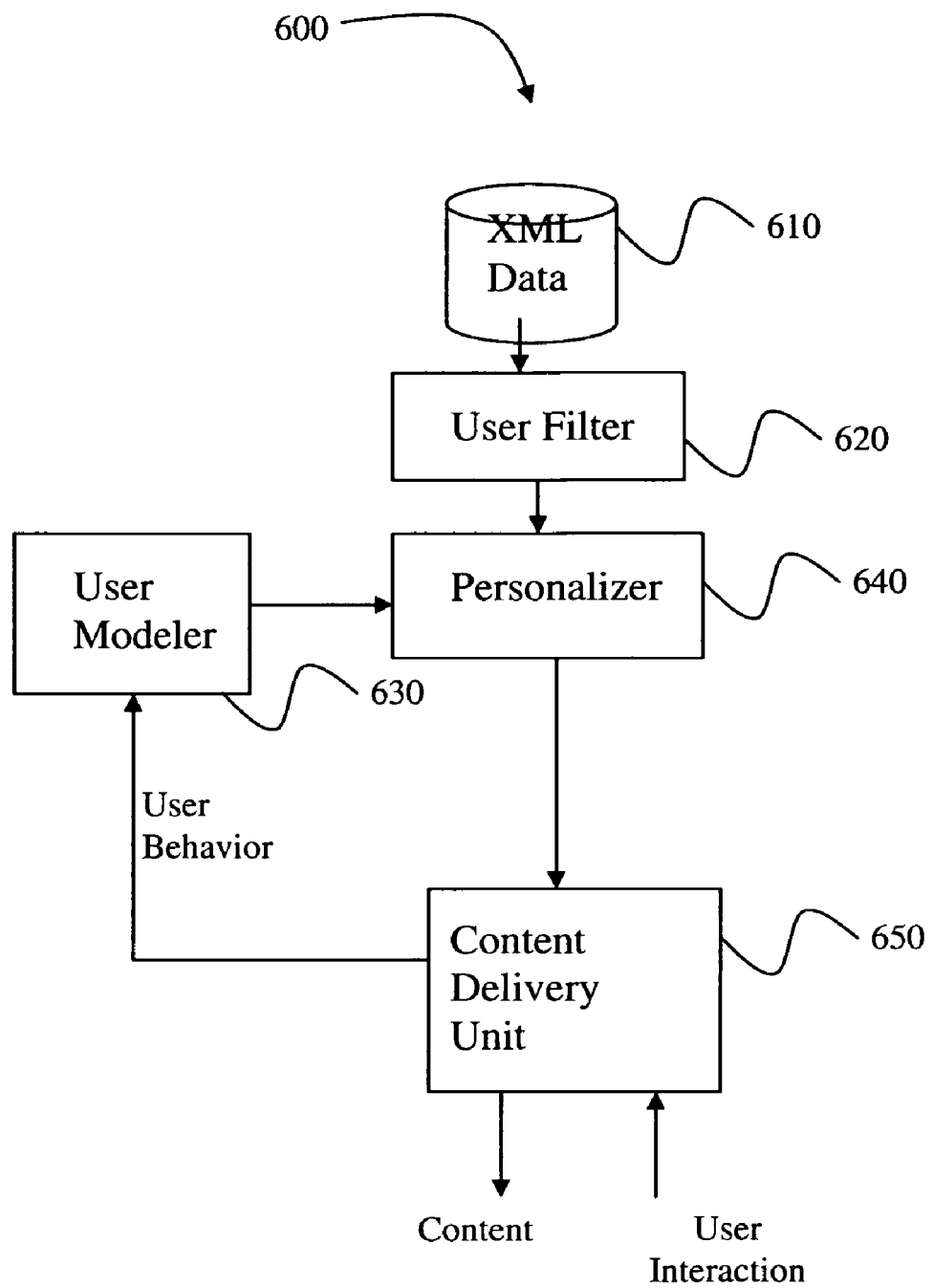
FIG. 6 is a schematic diagram illustrating a Bayesian system for adaptive hypermedia in accordance with an exemplary embodiment of the present disclosure.

Turning now to FIG. 6, a LMS stand-alone system embodiment is indicated generally by the reference numeral 600. Here, the LMS 600 includes an XML Data unit 610 that passes data to a User Filter 620. The User filter, in turn, passes filtered data to a Personalizer 640, which passes personalized data to a Content Delivery Unit ("CDU") 650. The CDU 650 supplies content and receives user interaction, and indicates user behavior to a User Modeler 630, which, in turn, provides user model input to the Personalizer 640. Thus, the web server 350 and client browser 360 of the client-server 300 of FIG. 3 may be replaced by the single CDU 650 such that the LMS system can be implemented on a stand-alone device, for example.

Embodiments of the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

It shall be understood by those of ordinary skill in the pertinent art that the above description is only representative of illustrative embodiments. For the convenience of the reader, the above description has focused on a representative sample of possible embodiments that are illustrative of the principles of the invention, and has not attempted to exhaustively enumerate all possible variations. Whether alternative embodiments may not have been presented for a specific portion of the invention is not to be considered a disclaimer of those alternate embodiments.

Other applications and embodiments can be straightforwardly implemented by those of ordinary skill in the pertinent art without departing from the spirit and scope of the present invention. Therefore, it is intended that the invention not be limited to the specifically described embodiments, but that the invention be defined in accordance with the claims that follow. It shall be appreciated that many undescribed embodiments are within the literal scope of the following claims, and that others are equivalent.

What is claimed is:

1. A learning management system, comprising:
    a processor;
    a content storage unit in signal communication with the processor for storing learning content;
    a user modeling unit in signal communication with the processor and having a user model, the user modeling unit comprising a macro level modeler and a micro level modeler, a user filter for distinguishing user types, and a user modeler in signal communication with the user filter for continuously inferring user sophistication level and user interest level in response to user interaction with the learning management system;
    a personalization unit in signal communication with the processor for personalizing the learning content stored in the content storage unit in response to the user model; and
    a user interface in signal communication with the processor for enabling a user to interact with the learning management system,
    wherein the learning management system delivers content responsive to user interaction with the learning management system, and
    wherein the user sophistication level is inferred using a data term indicative of the likelihood that a particular page sequence is viewed given a profile, and a prior term indicative of the likelihood of the profile itself.

2. A learning management system as defined in claim 1 configured as a Sharable Content Object Reference Model ("SCORM") system.

3. A learning management system as defined in claim 1 wherein the user sophistication level is modeled using Bayesian Classification.

4. A learning management system as defined in claim 1 wherein the user modeler includes a Markov model to keep track of user navigation history.

5. A learning management system as defined in claim 4 wherein the Markov model is implemented using a finite order Markov chain.

6. A learning management system as defined in claim 1 wherein the user filter includes selection means for the selection of the user type.

7. A learning management system as defined in claim 6 wherein the selection means includes means for using a user description to select the appropriate user type.

8. A computer-implemented method of modeling a user to deliver the appropriate content, comprising:
    modeling the user at a macro level by selecting a user type;
    modeling the user at a micro level in response to the macro modeling by gauging the user sophistication and interest level; and
    delivering the appropriate content to the user in accordance with the macro level modeling and the micro level modeling,
    wherein the user sophistication level is inferred using a data term indicative of the likelihood that a particular page sequence is viewed given a profile, and a prior term indicative of the likelihood of the profile itself.

9. A method as defined in claim 8, further comprising updating the model at the micro level in accordance with current user interactions.

10. A method as defined in claim 8 wherein the macro model is used to select the content to which the user will have access.

11. A method as defined in claim 8 wherein the user type is selected by analyzing the user's response to at least one question.

12. A method as defined in claim 8, the step of modeling the user at the micro level comprising:
    tracking user interaction;
    tracking page visitation history; and
    assigning a profile to the tracked user interaction and the tracked page visitation history.

13. A program storage device readable by machine, tangibly embodying a program of instructions executable by the machine to perform program steps for user modeling and content delivery, the program steps comprising:
    modeling the user at a macro level by selecting a user type;
    modeling the user at a micro level in response to the macro modeling by at least one of gauging the user sophistication and interest level; and
    delivering the appropriate content to the user in accordance with the macro level modeling and the micro level modeling,
    wherein the user sophistication level is inferred using a data term indicative of the likelihood that a particular page sequence is viewed given a profile, and a prior term indicative of the likelihood of the profile itself.

14. A device as defined in claim 13, the program steps further comprising updating the model at the micro level in accordance with current user interactions.

15. A device as defined in claim 13 wherein the macro model is used to select the content to which the user will have access.

16. A device as defined in claim 13 wherein the user type is selected by analyzing the user's response to at least one question.

17. A device as defined in claim 13, the program step of modeling the user at the micro level comprising:
    tracking user interaction;
    tracking page visitation history; and
    assigning a profile to the tracked user interaction and the tracked page visitation history.

18. A device as defined in claim 13, the program steps further comprising:
    storing learning content;
    personalizing the stored learning content in response to the user model; and
    delivering content responsive to the user model.

* * * * *